W. McCLINTOCK.
HOSE RACK.
APPLICATION FILED AUG. 29, 1914.
1,153,091.
Patented Sept. 7, 1915.
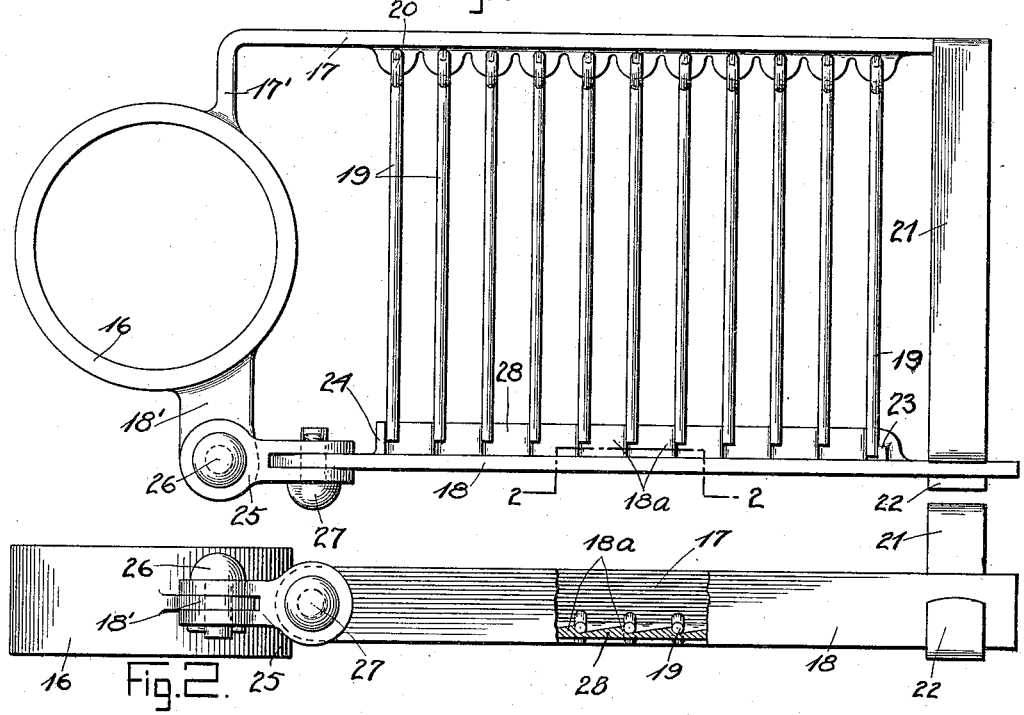
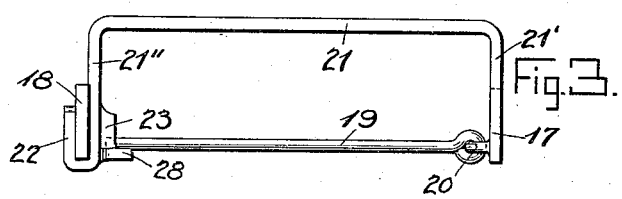
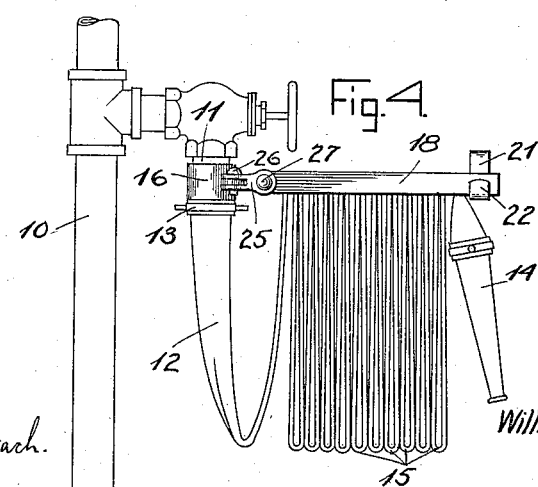
WITNESSES
INVENTOR
William McClintock
BY
ATTORNEYS

UNITED STATES PATENT OFFICE.

WILLIAM McCLINTOCK, OF NEW YORK, N. Y.

HOSE-RACK.

1,153,091.   Specification of Letters Patent.   Patented Sept. 7, 1915.

Application filed August 29, 1914. Serial No. 859,198.

*To all whom it may concern:*

Be it known that I, WILLIAM MCCLINTOCK, a citizen of the United States, and a resident of the city of New York, borough of the Bronx, in the county of Bronx and State of New York, have invented a new and Improved Hose-Rack, of which the following is a full, clear, and exact description.

This invention relates to fire apparatus, and has particular reference to appliances for supporting fire hose in position for immediate use in connection with the stand-pipes in city buildings.

Among the objects of the invention is to provide a hose rack of a simple and reliable nature, adapted for paying out the hose therefrom either loop by loop or all in one mass, according to the location of the fire with respect to the stand-pipe, or with respect to obstacles which may be interposed between the fire and the stand-pipe. Some hose-racks pay off the hose loop by loop, and others release the hose in one pack or mass at once. Each of these types of racks has its advantages, and a rack of one type may at times be undesirable. As a matter of fact, both types are good at times; that is to say, under some circumstances and conditions the rack which releases the hose immediately would be preferable, as where the fire is but a few feet from the stand-pipe, or, on the other hand, if the operator can walk directly away from the rack, and the point at which he wishes to use the hose is about the length of the hose or a little more, then the loop-by-loop type or system is desirable. It follows, therefore, that a simple construction of a hose rack adapted to meet both conditions or requirements, is necessary.

The foregoing and other objects of the invention are carried out in a preferred manner by the mechanism herein more fully described and claimed, and illustrated in the accompanying drawings, in which—

Figure 1 is a plan view; Fig. 2 is a side elevation, partly in section, on the line 2—2 in Fig. 1; Fig. 3 is a front end elevation; and Fig. 4 is a diagrammatic view indicating the rack as a whole secured in relation to a stand-pipe.

The several parts of the device may be made of any suitable materials, and the relative sizes and proportions thereof, as well as the general design of the mechanism, may be varied to a considerable extent without departing from the spirit of the invention hereinafter claimed.

Referring more particularly to the drawings, I show a stand-pipe 10, having a valve-controlled plug 11 in communication therewith.

At 12, I show a flexible hose of any suitable construction coupled permanently to said plug, as at 13. This hose is provided at its outer end, as usual, with a nozzle 14, and the intermediate portion of the hose is folded or looped into a plurality of loops 15 for connection to a rack or supporting means, whereby the hose is readily available for use in the event of an outbreak of fire within the building.

The improved construction, as herein set forth, comprises a collar 16 secured in any suitable place in connection with the stand-pipe, as for example, upon the plug 11, with its axis preferably vertical. This collar supports a pair of rigid arms 17 and 18, which, in normal position, lie in substantially the same horizontal plane and parallel to each other. A series of links 19 span the space between the arms, and are movably related to the arms and preferably connected permanently to one of the arms, as indicated at 20. These links are of a length proportional to the width of the hose when in flat condition, and each link supports a single loop 15 of the hose between the two arms. The arms aforesaid may be secured to the collar 16 in any suitable way, and either of them may be rigidly connected to the collar, or both may be pivotally connected to the collar, whereby a relative movement between the arms may be effected, for the purpose of detaching all of the links simultaneously when it is desired to drop the hose as a mass upon the floor. I therefore do not wish to be limited unnecessarily to any mechanical details of construction whereby I secure the result, namely, the facility for delivering the hose either loop by loop with the arms stationary or rigid, or the delivery of the hose as a unit or mass due to the relative movement between the arms.

In the embodiment of the invention shown herein, the arm 17 is connected by means of a shoulder 17' rigidly to the collar at its rear end. At its front end, there is formed a rigid arch or bridge 21, extending upwardly at 21' from the end of the arm and thence horizontally substantially to the vertical plane of the arm 18, and thence it is bent downwardly at 21'', forming a hook 22 in which the front end of the arm 18 is seated.

As will be noted from Fig. 3, the front end of the rack as a whole is free and unobstructed so as to insure the prompt delivery of the hose loop by loop from between the arms when they are held in their normal rigid position. The front link 19 is locked in position by means of a lug 23 of sufficient height and width for this purpose. This link holds the first loop of the hose, or the loop which carries the nozzle 14, and this loop being held in position rigidly upon the first link by means of the lug 23, all of the other loops are firmly held, notwithstanding a considerable amount of spring or elasticity which is always inherent in a flexible hose, especially when it is new. It is not necessary, therefore, for a new hose, when applied to this rack, to be bound by means of a cord or the like to prevent the elasticity thereof from forcing it out of place. The rearmost or last link 19 lies against a lug 24, which prevents the bulging or spreading of the mass of loops toward the plug 11. Each intermediate link may lie against a shoulder 18ª, if desired, in order to properly locate it with respect to the arm 18.

In order to remove the hose from the rack promptly loop by loop by an authorized person, he will seize the nozzle 14, and then, with his fingers or otherwise, he will lift the first link 19 out of engagement with the lug 23, and after this link drops down around its point of connection 20, all the other links will swing forwardly and downwardly without obstruction, to deliver the hose. The lug 23, however, serves normally to prevent accidental dropping of the hose, due to carelessness or mischief on the part of boys or the like.

The arm 18 is connected to the collar 16 or to a shoulder 18' extending outwardly therefrom, by means of a knuckle 25 having a pair of pivots 26 and 27 at its opposite ends, whose axes are arranged at right angles to each other. More specifically stated, the pivot 26 connects the knuckle to the shoulder 18' so as to swing around in a horizontal plane, and the pivot 27 connects the arm to the knuckle so as to allow the arm to swing around the pivot 27 in a vertical plane. The pivotal connections are such, however, as to limit the movement of the arm strictly to the plane perpendicular to the axis of the pivot 27 with respect to the knuckle, and at the same time, the knuckle can swing only in the horizontal plane perpendicular to the axis of the pivot 26. When it is desired to drop the hose as a mass upon the floor, the operator will lift upon the outer or front end of the arm 18, throwing it upwardly out of the hook 22, and then he will swing the arm and knuckle laterally or to the left as he faces the rack, whereby the links will all be freed from the ledge 28, and all will drop at practically the same time.

For re-racking the hose, the arm 18 will be returned to its normal condition in engagement with the hook 22, then, beginning at the rearmost link 19, the links will be inserted into the several loops and supported against their respective shoulders.

I claim:—

1. The herein described hose rack comprising, in combination, a pair of arms arranged in the same horizontal plane, means connecting said arms at one end whereby the opposite ends are adapted to move relatively from each other, means rigidly connected to the free end of one arm and extending thence into interlocking engagement with the free end of the other arm to normally prevent such relative movement, and a series of relatively movable supporting members for the individual hose loops extending between said arms, the construction and arrangement being such that the hose may be removed from said series of supporting members loop by loop, the arms remaining parallel to each other, or the hose will instantly drop automatically in a single mass as a result of the relative movement of the arms as aforesaid.

2. In a hose rack, the combination of a pair of rigid arms arranged normally in the same plane, pivotal connections for the rear ends of the arms adapting one to be moved upwardly from said plane and thence outwardly, a member permanently connected to and extending from the end of one of the arms into holding engagement with the free end of the other arm whereby the relative movement aforesaid is prevented, and a series of supporting members extending normally between the arms for holding the individual loops of the hose.

3. In a hose-rack, the combination of a pair of rigid arms arranged normally in the same horizontal plane, an arch rigidly connected to the end of one of the arms and extending thence upwardly and laterally to the vertical plane of the other arm and thence bent downwardly and terminating in engagement means for the other arm, the space between the arms and below the arch being unobstructed, pivotal supporting means for the rear end of the arm last referred to adapting it to be lifted out of engagement with the arch structure, and a series of supporting members extending normally between the arms, substantially as set forth.

In testimony whereof I have signed my name to this specification in the presence of two subscribing witnesses.

WILLIAM McCLINTOCK.

Witnesses:
GEO. L. BEELER,
GEORGE H. EMSLEE.

Copies of this patent may be obtained for five cents each, by addressing the "Commissioner of Patents, Washington, D. C."